United States Patent
Rajakarunanayake

(10) Patent No.: US 7,660,837 B2
(45) Date of Patent: Feb. 9, 2010

(54) METHOD FOR AUTOMATICALLY MANAGING DISK FRAGMENTATION

(75) Inventor: Yasantha Nirmal Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 50 days.

(21) Appl. No.: 11/543,827

(22) Filed: Oct. 6, 2006

(65) Prior Publication Data

US 2008/0005206 A1    Jan. 3, 2008

Related U.S. Application Data

(60) Provisional application No. 60/817,534, filed on Jun. 30, 2006.

(51) Int. Cl.
G06F 17/30    (2006.01)
(52) U.S. Cl. ..................................... 707/205
(58) Field of Classification Search ................. 707/200, 707/205, 100
See application file for complete search history.

(56) References Cited

U.S. PATENT DOCUMENTS

| | | | | |
|---|---|---|---|---|
| 5,274,807 | A * | 12/1993 | Hoshen et al. | 707/205 |
| 5,390,315 | A * | 2/1995 | Blandy et al. | 711/112 |
| 5,454,101 | A | 9/1995 | Mackay et al. | |
| 5,754,854 | A * | 5/1998 | Kanamori et al. | 718/104 |
| 5,991,862 | A * | 11/1999 | Ruane | 711/202 |
| 6,151,665 | A * | 11/2000 | Blumenau | 711/162 |
| 6,377,960 | B1 | 4/2002 | Qiu et al. | |
| 6,611,852 | B1 * | 8/2003 | Morley et al. | 707/206 |
| 6,615,224 | B1 | 9/2003 | Davis | |
| 6,636,879 | B1 * | 10/2003 | Doucette et al. | 707/205 |
| 6,636,951 | B1 | 10/2003 | Tachikawa | |
| 6,640,290 | B1 * | 10/2003 | Forin et al. | 711/156 |
| 6,658,437 | B1 * | 12/2003 | Lehman | 707/205 |
| 6,751,635 | B1 | 6/2004 | Chen et al. | |
| 6,839,822 | B2 * | 1/2005 | Knippel et al. | 711/170 |
| 6,874,004 | B2 * | 3/2005 | Jolly | 707/205 |
| 2002/0083037 | A1 | 6/2002 | Lewis et al. | |
| 2002/0198886 | A1 * | 12/2002 | Ramakrishnan | 707/100 |
| 2003/0088877 | A1 | 5/2003 | Loveman et al. | |
| 2003/0115222 | A1 | 6/2003 | Oashi et al. | |
| 2003/0158863 | A1 | 8/2003 | Haskin et al. | |
| 2003/0159007 | A1 | 8/2003 | Sawdon et al. | |
| 2003/0182253 | A1 | 9/2003 | Chen et al. | |
| 2003/0236836 | A1 | 12/2003 | Borthwick | |
| 2004/0205088 | A1 | 10/2004 | Toner | |
| 2005/0015409 | A1 | 1/2005 | Cheng et al. | |
| 2005/0021565 | A1 | 1/2005 | Kapoor et al. | |
| 2005/0080823 | A1 | 4/2005 | Collins | |
| 2008/0005205 | A1 | 1/2008 | Rajakarunanayake | |

OTHER PUBLICATIONS

Appleton, "A Non-Technical Look Inside the EXT2 File System", Aug. 1, 1997, 4 pgs.

* cited by examiner

*Primary Examiner*—James Trujillo
*Assistant Examiner*—William Spieler
(74) *Attorney, Agent, or Firm*—Sterne, Kessler, Goldstein & Fox PLLC

(57) ABSTRACT

In the current invention, an apparatus, method, and computer program product for allocating a contiguous area of memory from a repository are provided. In accordance with an embodiment of the invention, a repository pointer to a contiguous set of data blocks in the repository and a system pointer operable to point to the contiguous set of data blocks are allocated. The value of the repository pointer is subsequently assigned to the system pointer.

18 Claims, 7 Drawing Sheets

METHOD FOR AUTOMATICALLY MANAGING DISK FRAGMENTATION

CROSS-REFERENCE TO RELATED APPLICATIONS

The present application claims the benefit of U.S. Provisional Patent Application No. 60/817,534 filed on Jun. 30, 2006, which is incorporated herein by reference in its entirety.

BACKGROUND OF THE INVENTION

1. Field of the Invention

The present invention generally relates to data storage, and specifically to storage of video on a hard disk drive.

2. Background Art

Many users of satellite, cable, or even terrestrial video services have recently migrated from using analog magnetic media to record programming to digital video recorders ("DVRs"). DVRs take an input video from a video source, in digital format or in analog format by first digitizing the input video, and store the digital video on a fixed medium, such as a hard disk drive ("disk"). A user may subsequently select the recorded video for playback, record additional video, or delete the recorded video in order to free space in the disk for future recordings.

In a typical setup, a DVR is constantly connected to an input video source. Accordingly, many DVRs will automatically record the last 1-to-2 hours of actively watched live video in order to allow a user to quickly review anything the user has recently seen. Due to the temporary nature of this type of recording, the DVR will typically erase the automatically recorded video at some predefined interval.

As High Definition Television ("HDTV") standards have become more common in consumer use, DVRs have evolved to record HDTV video. HDTV video includes high resolution images that require higher data storage needs for recording. A typical 2-to-3 hour HDTV recording can occupy a 15-to-20 Gigabyte ("GB") file.

The DVR's disk, used to store recorded content, typically includes a contiguous memory area divided into blocks. Blocks on a disk are the smallest units in which data are read from and written to the disk. In a typical disk, block sizes are small, usually around 4 kilobytes ("kB"). With a 4 kB block size, a file comprising 7 kB worth of data will consume 8 kB of disk space, because it will fully consume a 4 kB block and will consume 3 kB of a second 4 kB block. However, the remaining 1 kB on the second block cannot be used to store additional data.

In traditional filesystems, a file's structure is typically kept in an inode. The inode includes pointers to each of the blocks of data necessary to construct the file.

These pointers may include a number of direct pointers, which point directly to blocks of the file's data, and some number of n-way (singly, doubly, etc.) indirect pointers. Indirect pointers are pointers that point to blocks of data that contain additional pointers. For each level of indirect access, there exists such a set of blocks of data containing additional pointers. At the final level of indirect access (the first level for indirect pointers, the second level for doubly indirect pointers, etc.), the pointers contained within the block of data are direct pointers.

Indirect pointers within an inode exist in order to allow individual files to encompass many blocks of data, and therefore allowing for very large file sizes. An inode with only direct access pointers would require the allocation, in advance, of memory for storing direct pointers to each block of data of the largest expected file size. Such an operation is wasteful when allocating smaller files. However, traversing several levels of indirection to access all of the blocks of data comprising a larger file is also expensive.

The typical 2-to-3 hour HDTV recording, occupying 15-to-20 GB of disk space, requires millions of 4 kB blocks to store the recording. Such a small block size is typically used in order to conserve space on the disk, as a 20 GB recording may consequently only waste most of a 4 kB block, an insignificant amount relative to the size of the recording. The drawback of using a small block size is, as noted, the sheer quantity of blocks needed to compose the recording. Small block sizes used to store files many times larger than the block size can often lead to a situation called fragmenting which may severely hinder the performance of a DVR attempting to read or write a video recording.

A disk will usually attempt to allocate to a recording a contiguous set of blocks that comprises a large enough disk area to store the entire file. After many such areas are allocated, and files are subsequently deleted, data remains-in locations throughout the disk, with areas of free, contiguous memory between them. If a new recording is made that is too large to fit within any of the free, contiguous memory locations, it is necessary to allocate block fragments, comprising groups of blocks from non-contiguous memory locations. A typical disk operates most efficiently when it is accessing contiguous blocks of memory, and having to read from or write to memory locations in various parts of the disk will slow down its access times. Furthermore, wear and tear on the disk is increased by having to access multiple fragmented blocks. As previously noted, traversing through several levels of indirect pointers to access a data block is costly, and becomes a more serious problem when the data blocks accessed as a result of a traversal through indirect pointers are not stored in a contiguous area of memory.

Due to the nature of standard filesystems, specifically memory to disk architecture requirements, it is often not possible to guarantee that more data will be contiguous on the disk as a solution. Accordingly, what is desired is a method that can be used, independent of the filesystem and without major modification to the filesystem itself, to effectively solve the severe fragmentation problem that exists in DVR disks.

BRIEF SUMMARY OF THE INVENTION

An apparatus for storing data files in a contiguous area of a memory is disclosed. The apparatus comprises a CPU and a memory. The memory has a data partition that is divided into blocks of a first block size. The memory further comprises indirect blocks of a second block size, which are formed by pointing to a contiguous set of blocks of the first block size totaling the second block size. In accordance with an embodiment of the present invention, the memory includes a tangible recording medium, such as a hard disk drive.

A method for accessing data files in a contiguous area of a memory is also disclosed. The method comprises locating a record for a data file. The method further comprises accessing an indirect block pointer within the record, wherein the indirect block pointer points to an indirect block comprising a list of pointers to a contiguous set of blocks of a first block size totaling a second block size.

BRIEF DESCRIPTION OF THE DRAWINGS

The present invention is described with reference to the accompanying drawings. In the drawings, like reference numbers indicate identical or functionally similar elements.

Additionally, left-most digit(s) of a reference number identifies the drawing in which the reference number first appears.

DETAILED DESCRIPTION OF THE INVENTION

Digital Video Recorder

Figure 1:
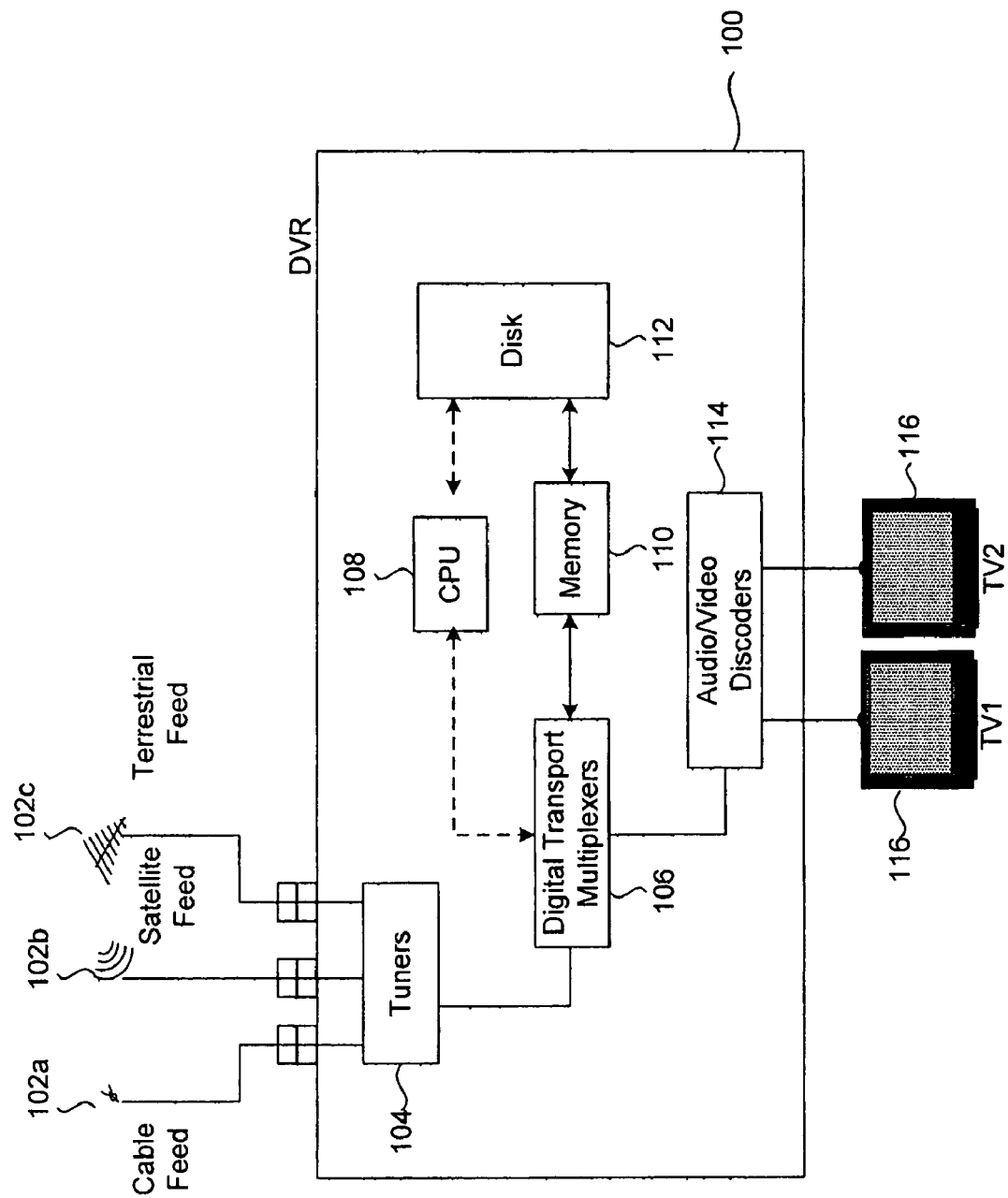
FIG. 1 illustrates a set-top box operable to perform digital video recording, in accordance with an embodiment of the present invention.

FIG. 1 illustrates a digital video recorder ("DVR") set-top box 100 having input video feeds 102a-102c and tuners 104. The tuners 104 are connected through digital transport multiplexers 106 to a CPU 108, a main memory 110, and a disk 112. The digital transport multiplexers are further connected to audio/video decoders 114, which in turn are connected to television monitors 116.

The tuners 104 are operable to select a video feed from a cable feed 102a, a satellite feed 102b, or a terrestrial feed 102c. One of sufficient skill in the relevant arts will recognize that the feeds 102a-102c could be any other medium of video transmission. The tuners 104 provide the selected video to digital transport multiplexers 106. The digital transport multiplexers 106 are then operable to transmit the selected video feed to audio/video decoders 114 for display on one or more television monitors 116.

The digital transport multiplexers 106 can alternatively transmit the selected video feed to a CPU 108 and a main memory 110 for storage in a disk 112. Furthermore, the CPU 108 can transmit a video feed stored on disk 112 through the main memory 110 to the digital transport multiplexers 106. The digital transport multiplexers 106 can be instructed to forward the video feed stored on disk 112 to the audio/video decoders 114 rather than the selected video feed coming from tuners 104. In this scenario, the audio/video decoders 114 will decode and transmit the video feed stored on disk 112 to the television monitors 116 for display.

One skilled in the relevant arts will appreciate that a number of different memory devices may be used instead of disk 112, including but not limited to such memory devices not typically used in DVR applications where the disclosed invention may nevertheless be employed.

Disk Organization

Figure 2:
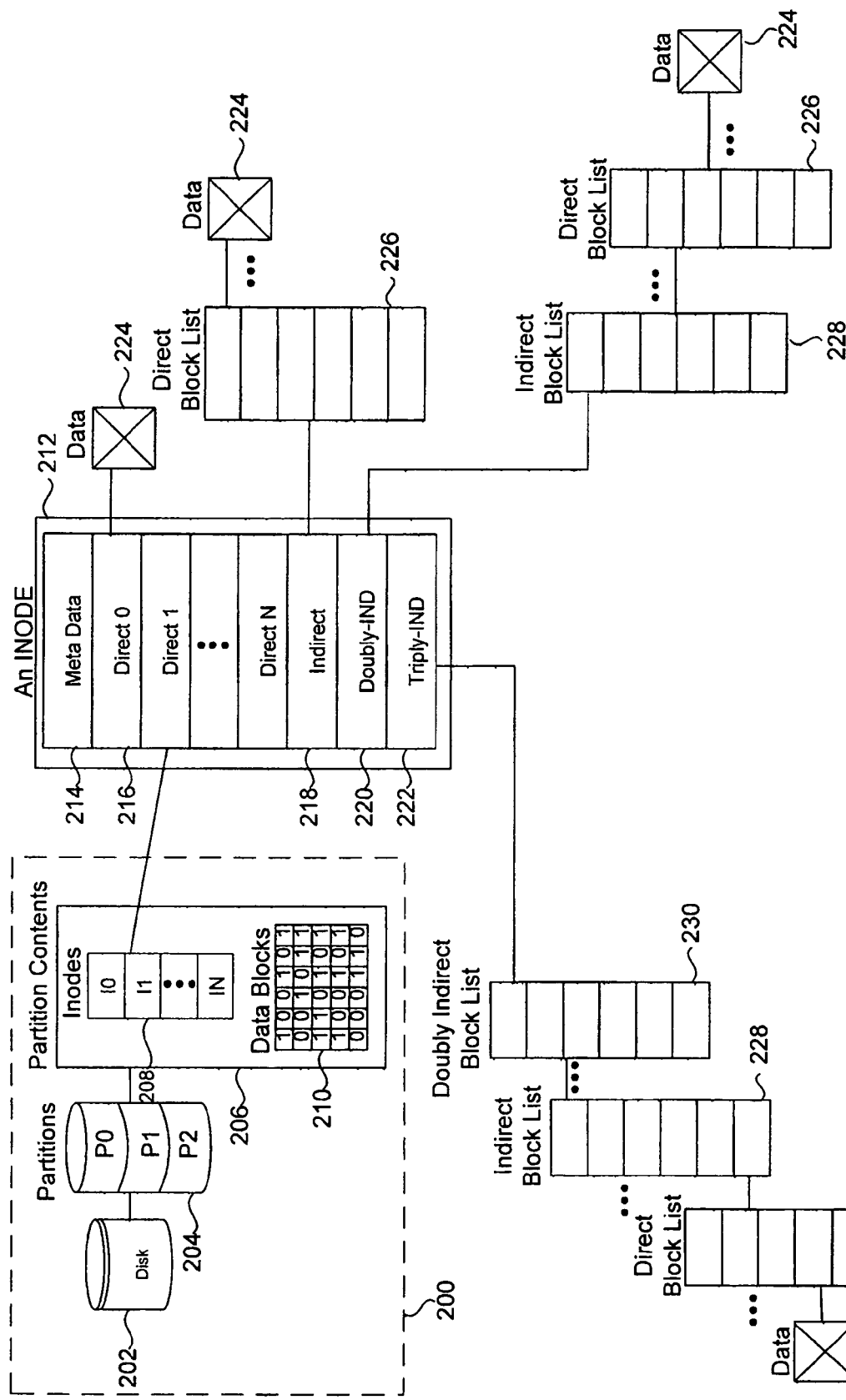
FIG. 2 illustrates a typical structural organization of data blocks on a disk, in accordance with an embodiment of the present invention.

A typical organizational structure for storing data in a disk such as disk 112 is shown in FIG. 2. A disk 202 can be divided into one or more partitions 204. Each partition has partition contents 206 which include modes 208 and data blocks 210. An individual inode 212 comprises meta data 214, direct block pointers 216, indirect block pointers 218, doubly indirect block pointers 220, and triply indirect block pointers 222. One skilled in the relevant arts will appreciate that the quantity and availability of each kind of n-way indirect block pointers may vary based on the system, and may include greater or fewer levels of indirect block access. One skilled in the relevant arts with further appreciate that an inode 212 is only an example of a record that can be used to specify a file, and other structures may be employed in a similar manner.

An inode 212 serves as a record for an individual file and comprises meta data 214, used for storing information about the file, and a series of block pointers. Each of the block pointers in the inode 212 contain a pointer to a block location within the data blocks 210. The direct block pointers 216 each contain a pointer to a block location comprising a block of data 224. Indirect block pointers 218 contain a pointer to a block location comprising a direct block list 226. The direct block list 226 comprises pointers to block locations, each comprising a block of data 224.

Similarly, the doubly-indirect block pointers 220 contain a pointer to a block location comprising an indirect block list 228, which in turn comprises pointers to block locations comprising direct block lists 226. The direct block lists 226 comprise pointers to block locations, each comprising a block of data 224.

Triply-indirect block pointers 222 contain a pointer to a block location comprising a doubly-indirect block list 230. The doubly-indirect block list 230 comprises pointers to block locations comprising indirect block lists 228, which in turn operate as detailed above.

In a typical storage system, a single file stored on a disk 202 is associated with a particular inode 212. If the file size is less than the size of a single block, then a single direct block pointer 216 will be used to point to the single block 224 where the data is placed. If the file is larger, then indirect block pointers are used in order to reference a direct block list 226 containing pointers to multiple data blocks 224.

Assuming a block size of 4 kB and a block list size of 1024 entries, a direct block list 226 contains pointers for 4 MB worth of data blocks 224. Accordingly, an indirect block list 228 with 1024 entries contains pointers for 1024 direct block lists 226, each comprising pointers for 4 MB worth of data blocks 224. Therefore, indirect block lists 228 in a typical system comprises pointers for 4 GB worth of data blocks 224. In a similar manner, doubly indirect block list 230 comprises 4 TB worth of data blocks 224. As a consequence, the singly indirect pointer within the inode may point to up to 4 MB of data, the doubly indirect pointer 4 GB of data, and the triply indirect pointer 4 TB of data.

Each block pointer may reference any particular 4 kB block on the disk 202 without limitation. Accordingly, it is possible for a first data block 224 referenced within a direct block list 226 to be located at a drastically different location on disk 202 than a second data block 224 referenced within the direct block list 226. Because an inode traditionally represents an entire single file, blocks located in drastically different locations on disk will cause slowdowns when attempting to access the file. Therefore, it is desirable to have all of the blocks that form a file to be allocated contiguously.

Contiguous Block Repository

Figure 3:
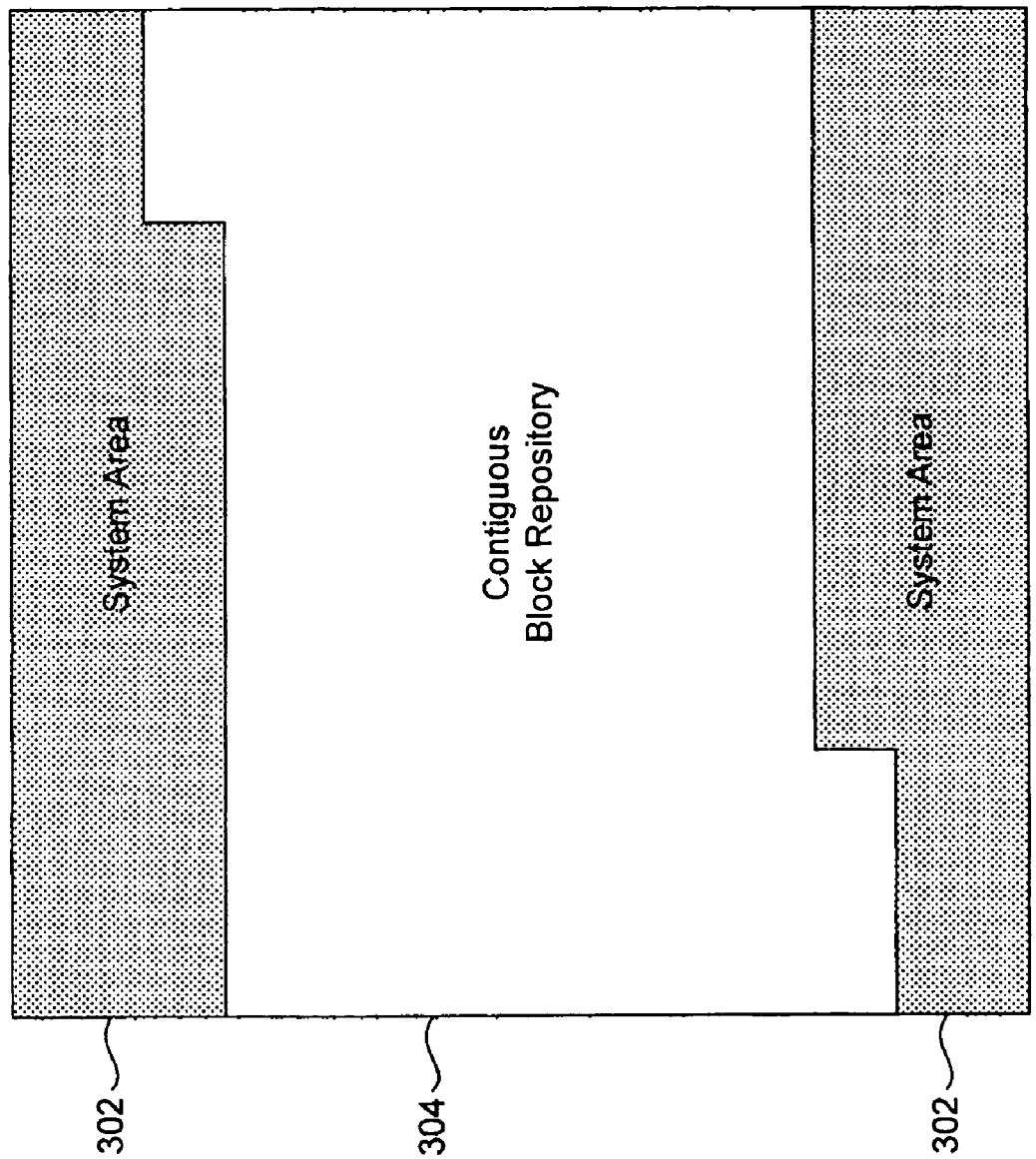
FIG. 3 illustrates a contiguous area of disk space allocated to a contiguous block repository, in accordance with an embodiment of the present invention.

Referring now to FIG. 3, in accordance with an embodiment of the present invention, a contiguous block repository ("CBR") 304 is implemented in order to ensure the contiguous allocation of larger files. A CBR is a specially-designated disk area comprising an inode with an identical structure to any other inode in the system and contiguous disk space. The CBR differs from other inodes in that it contains pointers to data blocks located within a contiguous area of disk 304 rather than a system area 302. In order to ensure that a contiguous area of the disk can be successfully allocated, the allocation is usually done soon after the disk is first formatted. The system area 302 may be used as usual through the allocation and deallocation of inodes.

Figure 4:
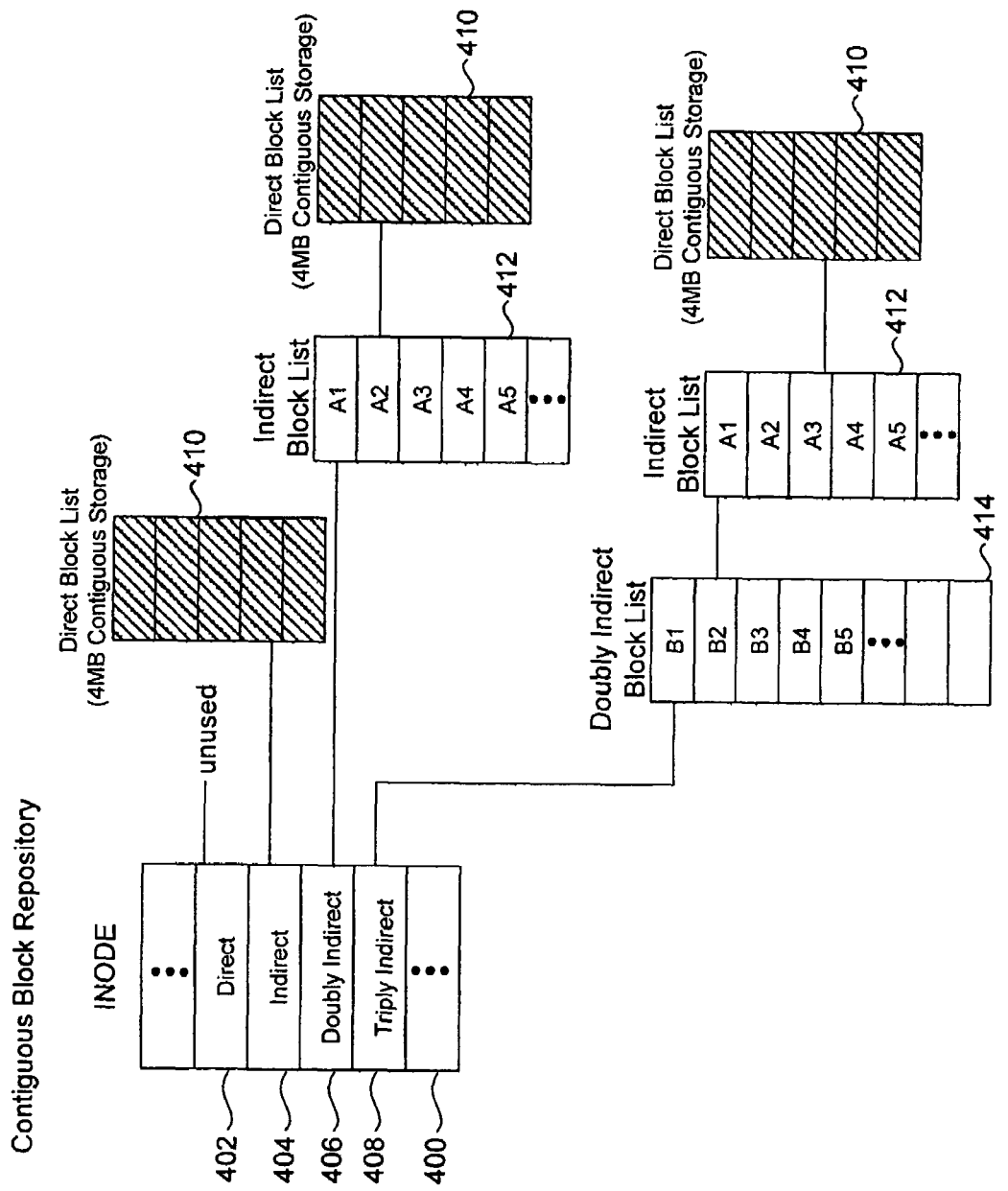
FIG. 4 illustrates a typical structural organization of data blocks in a contiguous block repository, in accordance with an embodiment of the present invention.

The CBR inode is depicted in FIG. 4. The entire CBR is referenced through the use of a single inode 400. As this inode has the same physical structure as other inodes in the system, it necessarily has an identical block size. Assuming, as above, that the block size is 4 kB, direct block pointer 402 would point to a single 4 kB block. However, in the CBR inode, direct block pointer 402 is unused. Instead, the indirect block pointer 404 is used first to refer to 4 MB worth of disk blocks via 1024 pointers to 4 kB blocks contained within the direct block list 410. What makes direct block list 410 different from the direct block list 226 as shown in FIG. 2 is that all of the blocks in direct block list 410 are held in a 4 MB contiguous space on disk. Similarly, doubly indirect pointer 406 refers to an indirect block list 412 comprising 4 GB worth of 4 MB contiguous blocks 410. Triply indirect pointer 408 and doubly indirect block list 414 function in a similar manner.

In order to ensure that the direct block list 410 functions as a contiguous 4 MB space, it is necessary to control the manner in which the 4 kB blocks comprising the direct block list 410 are allocated. Accordingly, two special system calls are implemented in accordance with an embodiment of the present invention. These calls may look like allocate_from_cbr(file_descriptor, offset, size) and free_to_cbr(file_descriptor, offset, size), wherein file_descriptor is a unique identifier for a file, the offset is the file's position in storage, and the size is how many chunks of storage are needed. The allocate_from_cbr function provides a contiguous area of CBR memory for storage of the file, whereas free_to_cbr releases a contiguous area of CBR memory used by a file. One skilled in the relevant art will recognize that there are a variety of means by which the CBR inode structure can be used to allocate or free a contiguous block of memory in the CBR, and that these two functions are merely illustrative.

Due of the nature of the CBR inode, it is also possible to allocate longer spans of contiguous data blocks if done consistently. In accordance with another embodiment of the present invention, indirect block list 412 comprises pointers to a contiguous 4 GB area of memory by reference to 1024 direct block lists 410 of 4 MB contiguous storage. As one skilled in the relevant arts will appreciate, the exact quantities are for illustrative purposes only, and may further be applied to doubly, triply, or n-order indirect block lists for larger contiguous block regions.

Additional Benefits

While a 15-to-20 GB file may still be fragmented when using 4 MB chunk sizes, it is quite acceptable for a DVR disk system to have 4 MB chunks which are contiguous, whereas 4 KB chunk fragmentation would be unacceptable. By using a CBR, rapid transfer of preallocated block chunks to and from the CBR allows normal DVR recordings to be guaranteed allocation in chunk sizes of 4 MB or so.

Figure 5:
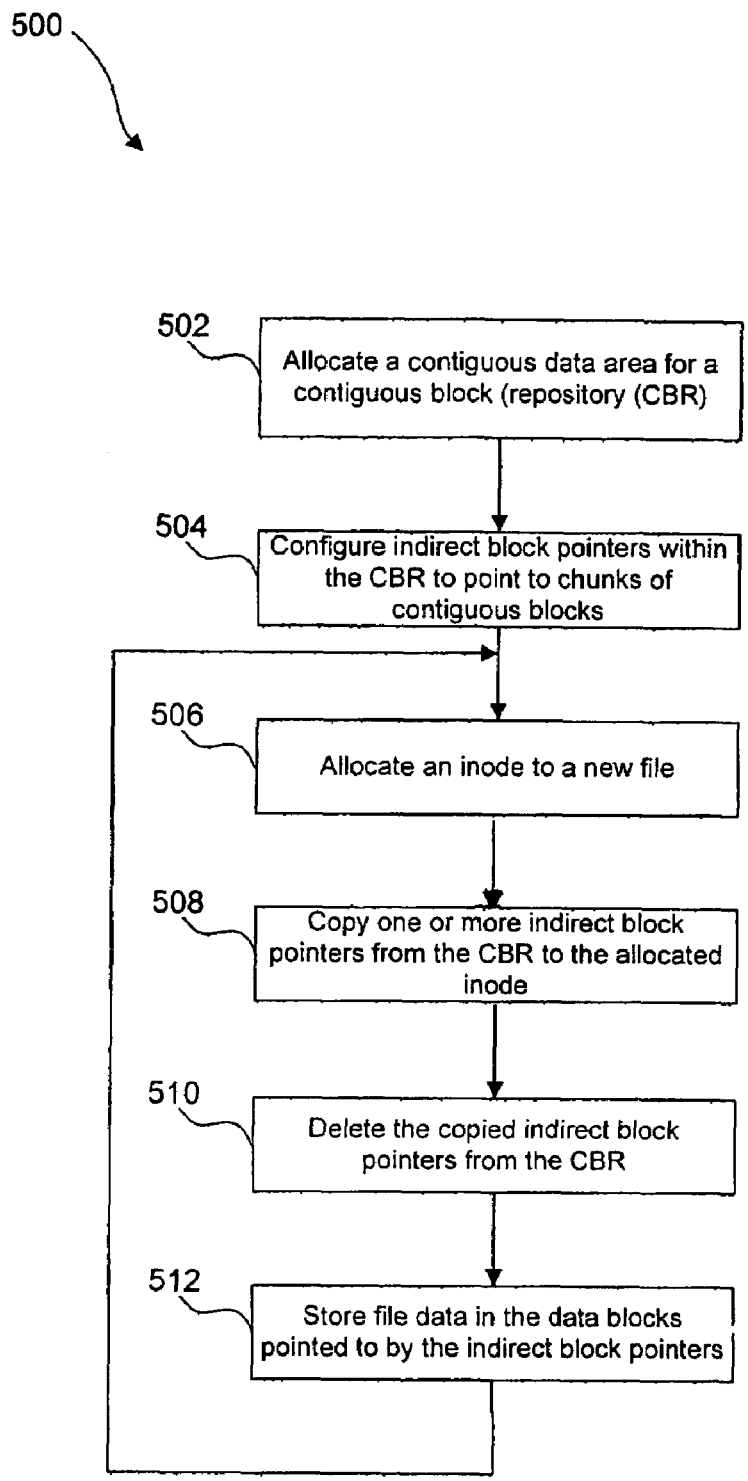
FIG. 5 is a flow chart illustrating a method by which a data chunk is transferred from one inode to another, in accordance with an embodiment of the present invention.

Referring now to FIG. 5, a flowchart 500 illustrates the steps by which the CBR is configured and contiguous data chunks are allocated from the CBR for a new file, in accordance with an embodiment of the present invention. In step 502, a contiguous data area in a memory is allocated for use by the CBR. The CBR, which comprises a special CBR inode, is configured in step 504 to point to the various blocks of data in comprising a contiguous chunk of data from the contiguous data area in memory.

Once the CBR has been configured in accordance with steps 502 and 504, a new file is created by allocating an inode to the new file in step 506, in accordance with an embodiment of the present invention. As data is obtained for storage within the new file, one or more indirect block pointers from the CBR are copied to the allocated inode in step 508. As the indirect block pointers are copied to the allocated inode in step 508, they are deleted from the CBR in step 510 in order to prevent them from being reallocated to another file. With the contiguous chunks now available via indirect block pointers in the allocated inode, the data obtained for storage within the new file is stored in the parts of the contiguous data area pointed to by the indirect pointers to contiguous chunks of data in step 512. Steps 506-512 may be subsequently repeated in order to create additional files, while steps 502-504 are only performed during the initial configuration of the CBR, in accordance with an embodiment of the present invention.

Figure 6:
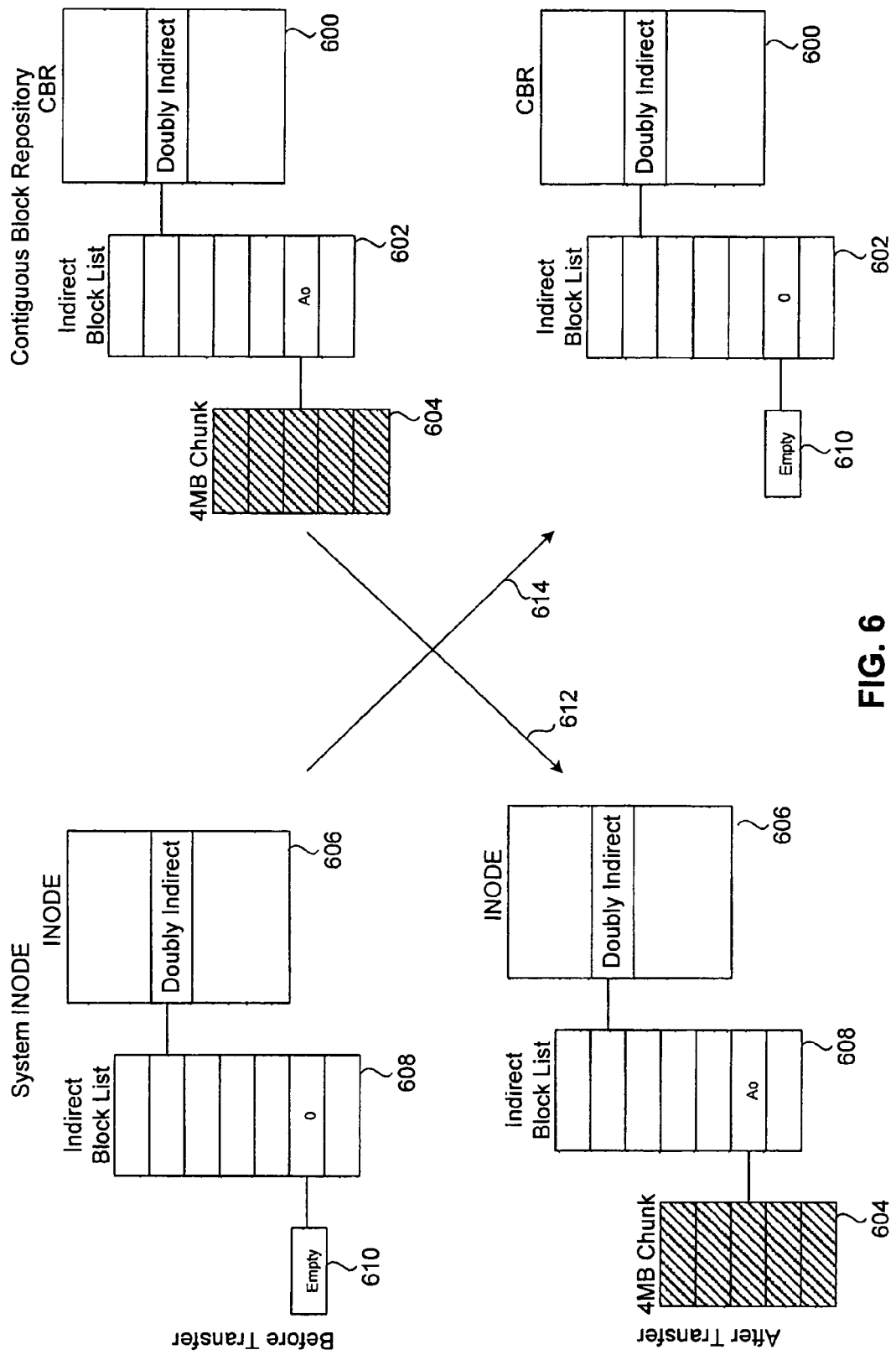
FIG. 6 illustrates the transfer of a data chunk from one inode to another, in accordance with an embodiment of the present invention.

Because blocks of data are contiguous within a direct block list, it is not necessary to traverse the entire direct block list to determine the address of each individual block within the list that needs to be manipulated. Referring now to FIG. 6, with continued reference to FIG. 5, the CBR and a system inode are shown prior to a transfer as in step 508 along the top of FIG. 6, and subsequent to the transfer along the bottom of FIG. 6. Prior to the transfer, CBR inode 600 contains a pointer to indirect block list 602, which in turn contains a pointer to a 4 MB chunk of contiguous memory 604. This configuration of the CBR inode 600 results from performing steps 502 and 504. The value of the pointer to the indirect block list 602, as held in the indirect block list, is $A_0$. Regular system inode 606 contains a pointer to indirect block list 608, which in turn contains a pointer with a null value 610, indicating that it does not contain a list of direct pointers to data blocks. This inode 606, containing no pointers to data blocks, is empty, and is allocated in step 506 for use in the creation of a new file, in accordance with an embodiment of the present invention.

In order to transfer the 4 MB chunk 604 to the null-valued location in indirect block list 608 under inode 606, a first operation 612 is performed in which the pointer value $A_0$ 604 is placed in indirect block list 608. The first operation 612 corresponds to the transfer of pointers from the CBR 600 to the inode 606, as in step 508. A second operation 614 is performed in which the pointer value 0 608 is placed in indirect block list 602. This second operation 614 corresponds to the deletion of the copied pointer from the CBR 600, as in step 510. In this manner, contiguous chunks of memory can be transferred as a 4 MB chunk rather than block-by-block, in a very efficient manner.

Similarly, manipulation of data through allocation and freeing of storage is expedited because only 4 MB chunks of data are referenced, rather than individual blocks. Referring again to FIG. 4, even though the direct block list 410 includes a set of addresses to individual 4 kB blocks of data, because they are contiguous it is not necessary to traverse the list in order to determine the location of each block; it suffices to know the location of the first block and the size of the contiguous storage space.

One skilled in the relevant arts will further appreciate that the benefits obtained through the use of a CBR are not limited to DVR applications, and can be beneficial in any situation where large files must be accessed in a timely manner, and must be made available alongside a traditional filesystem capable of storing smaller files efficiently as well. Furthermore, the disclosed data storage techniques are not limited to any particular memory device or those commonly used in DVR applications.

Example Computer System Implementation

Figure 7:
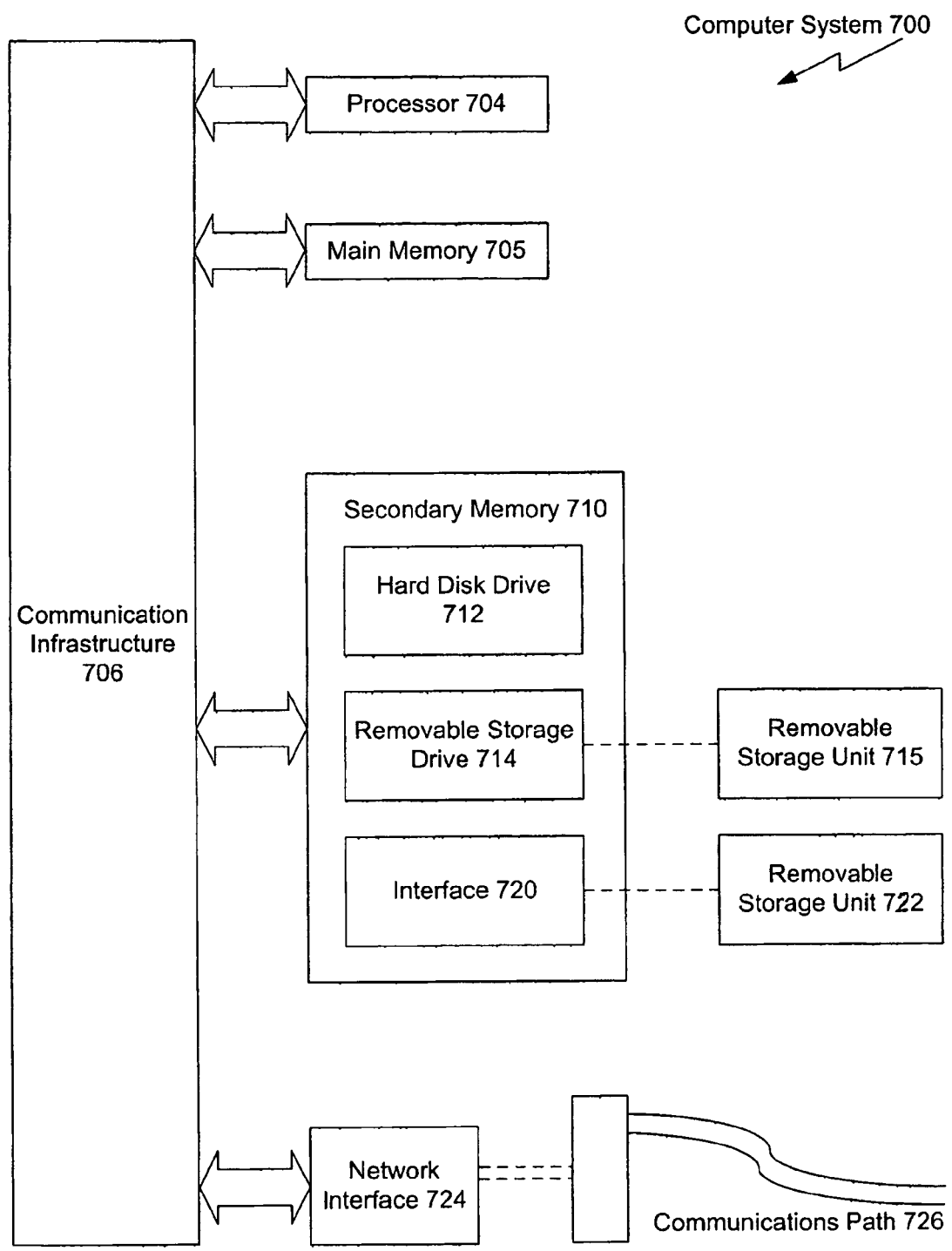
FIG. 7 depicts an example computer system in which the present invention may be implemented.

Various aspects of the present invention can be implemented by software, firmware, hardware, or a combination thereof. FIG. 7 illustrates an example computer system 700 in which the present invention, or portions thereof, can be implemented as computer-readable code. For example, the method illustrated by flowchart 500 of FIG. 5 can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 705, preferably random access memory (RAM), and may also include a secondary memory 710. Secondary memory 710 may include, for example, a hard disk drive 712 and/or a removable storage drive 714. Removable storage drive 714 may comprise a floppy disk drive, a magnetic tape drive, an optical disk drive, a flash memory, or the like. The removable storage drive 714 reads from and/or writes to a removable storage unit 715 in a well known manner. Removable storage unit 715 may comprise a floppy disk, magnetic tape, optical disk, etc. which is read by and written to by removable storage drive 714. As will be appreciated by persons skilled in the relevant art(s), removable storage unit 715 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 715, removable storage unit 722, a hard disk installed in hard disk drive 712, and signals carried over communications path 726. Computer program medium and computer usable medium can also refer to memories, such as main memory 705 and secondary memory 710, which can be memory semiconductors (e.g. DRAMs, etc.). These computer program products are means for providing software to computer system 700.

Computer programs (also called computer control logic) are stored in main memory 705 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the method illustrated by flowchart 500 of FIG. 5 discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An apparatus for storing data files in a contiguous area of a memory, the apparatus comprising:
  a memory, comprising:
    a contiguous block repository comprising a contiguous set of data blocks allocated specifically to the contiguous block repository;
    a contiguous block repository inode associated with the contiguous block repository, the contiguous block repository inode comprising a repository pointer to the contiguous set of data blocks; and
    a system pointer; and
  a CPU, connected to the memory, for assigning the value of the repository pointer to the system pointer responsive to a repository allocation instruction, wherein the repository pointer is selected from the contiguous block repository inode.

2. The apparatus, as set forth in claim 1, the contiguous block repository further comprising:
   a second contiguous set of data blocks; and
   an indirect pointer block comprising a plurality of repository pointers, wherein the plurality of repository pointers address the second contiguous set of data blocks.

3. The apparatus as set forth in claim 2, the contiguous block repository inode further comprising:
   an indirect pointer to point to the indirect pointer block in the repository.

4. The apparatus as set forth in claim 3, the memory further comprising:
   a system indirect pointer, wherein the CPU assigns the value of the indirect pointer to the system indirect pointer responsive to a repository allocation instruction.

5. The apparatus, as set forth in claim 1, wherein the memory comprises a fixed recording medium.

6. The apparatus, as set forth in claim 5, wherein the fixed recording medium comprises a hard disk drive.

7. A method for storing data files in a contiguous area of a memory, the method comprising:
   accessing a contiguous block repository inode associated with a contiguous block repository comprising a contiguous set of data blocks allocated specifically to the contiguous block repository, the contiguous block repository inode comprising a repository pointer to the contiguous set of data blocks;
   defining a system pointer; and
   assigning the value of the repository pointer to the system pointer responsive to a repository allocation instruction, wherein the repository pointer is selected from the contiguous block repository inode.

8. The method of claim 7, further comprising:
   allocating an indirect pointer block in the repository comprising a plurality of repository pointers, wherein the plurality of repository pointers address a second contiguous set of data blocks.

9. The method of claim 8, further comprising:
   allocating an indirect pointer in the contiguous block repository inode to point to the indirect pointer block in the repository.

10. The method of claim 9, further comprising:
    defining a system indirect pointer; and
    assigning the value of the indirect pointer to the system indirect pointer responsive to a repository allocation instruction.

11. The method of claim 7, wherein the memory comprises a fixed recording medium.

12. The method of claim 11, wherein the fixed recording medium comprises a hard disk drive.

13. A computer program product comprising a computer-usable storage medium having computer program logic recorded thereon for enabling a processor to store data files in a contiguous area of memory, the computer program logic comprising:
    accessing means for enabling a processor to access a contiguous block repository inode associated with a contiguous block repository comprising a contiguous set of data blocks allocated specifically to the contiguous block repository, the contiguous block repository inode comprising a repository pointer to the contiguous set of data blocks;
    defining means for enabling a processor to define a system pointer; and
    assigning means for enabling a processor to assign the value of the repository pointer to the system pointer responsive to a repository allocation instruction, wherein the repository pointer is selected from the contiguous block repository inode.

14. The computer program logic of claim 13, further comprising:
    allocating means for enabling a processor to allocate an indirect pointer block in the repository comprising a plurality of repository pointers, wherein the plurality of repository pointers address a second contiguous set of data blocks.

15. The computer program logic of claim 14, further comprising:
    allocating means for enabling a processor to allocate an indirect pointer in the contiguous block repository inode to point to the indirect pointer block in the repository.

16. The computer program logic of claim 15, further comprising:
    defining means for enabling a processor to define a system indirect pointer; and
    assigning means for enabling a processor to assign the value of the indirect pointer to the system indirect pointer responsive to a repository allocation instruction.

17. The computer program logic of claim 13, wherein the memory comprises a fixed recording medium.

18. The computer program logic of claim 17, wherein the fixed recording medium comprises a hard disk drive.

\* \* \* \* \*

UNITED STATES PATENT AND TRADEMARK OFFICE
CERTIFICATE OF CORRECTION

PATENT NO. : 7,660,837 B2
APPLICATION NO. : 11/543827
DATED : February 9, 2010
INVENTOR(S) : Yasantha Nirmal Rajakarunanayake It is certified that error appears in the above-identified patent and that said Letters Patent is hereby corrected as shown below:

Column 1
Lines 50-62, please delete the paragraph break at lines 52-53 and combine the text as a single paragraph.

Signed and Sealed this

Thirtieth Day of November, 2010

David J. Kappos
*Director of the United States Patent and Trademark Office*